United States Patent
Tadano

(10) Patent No.: US 10,816,667 B2
(45) Date of Patent: Oct. 27, 2020

(54) IMAGING APPARATUS AND IMAGING CONTROL METHOD

(71) Applicant: SONY CORPORATION, Tokyo (JP)

(72) Inventor: Ryuichi Tadano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 364 days.

(21) Appl. No.: 15/578,364

(22) PCT Filed: Feb. 2, 2017

(86) PCT No.: PCT/JP2017/003732
§ 371 (c)(1),
(2) Date: Nov. 30, 2017

(87) PCT Pub. No.: WO2017/141715
PCT Pub. Date: Aug. 24, 2017

(65) Prior Publication Data
US 2018/0149752 A1 May 31, 2018

(30) Foreign Application Priority Data
Feb. 16, 2016 (JP) .................... 2016-026944

(51) Int. Cl.
*G01C 3/08* (2006.01)
*G01S 17/89* (2020.01)
(Continued)

(52) U.S. Cl.
CPC ............ *G01S 17/89* (2013.01); *G01S 7/4808* (2013.01); *G01S 7/4863* (2013.01);
(Continued)

(58) Field of Classification Search
CPC ...... G01S 17/89; G01S 7/4808; G01S 7/4863; G01S 7/4865; G01S 7/4915; G01S 17/36; H04N 5/374; H04N 5/378
See application file for complete search history.

(56) References Cited

U.S. PATENT DOCUMENTS

2007/0146682 A1 6/2007 Tachino et al.
2012/0177252 A1 7/2012 Korekado et al.
(Continued)

FOREIGN PATENT DOCUMENTS

DE 112010003649 B4 8/2014
DE 112015002711 T5 2/2017
(Continued)

OTHER PUBLICATIONS

International Search Report and Written Opinion of PCT Application No. PCT/JP2017/003732, dated Apr. 18, 2017, 08 pages of ISRWO.

*Primary Examiner* — Yuqing Xiao
*Assistant Examiner* — Kimberly Jasmin Ramsarup
(74) *Attorney, Agent, or Firm* — Chip Law Group

(57) ABSTRACT

Provided is an imaging apparatus and an imaging control method, which can change a distance measuring accuracy according to a distance from the imaging apparatus to an object. The imaging apparatus includes a control unit that controls outputs of an irradiation signal including an irradiation code and a reference signal including a reference code, and an imaging unit that includes a photoelectric conversion element. The imaging unit generates a pixel signal indicating correlation between reception light incident into the photoelectric conversion element and the reference signal, and generates a distance pixel signal based on a distance to an object on the basis of a ratio between a first pixel signal in a case where a first combination of the irradiation signal and the reference signal is used and a second pixel signal in a case where a second combination of the irradiation signal and the reference signal is used.

7 Claims, 16 Drawing Sheets

(51) Int. Cl.
*G01S 17/10* (2020.01)
*G03B 13/36* (2006.01)
*H04N 5/374* (2011.01)
*G01S 7/4915* (2020.01)
*G01S 17/36* (2006.01)
*H04N 5/378* (2011.01)
*G01S 7/48* (2006.01)
*G01S 7/4863* (2020.01)
*G01S 7/4865* (2020.01)

(52) U.S. Cl.
CPC .......... *G01S 7/4865* (2013.01); *G01S 7/4915* (2013.01); *G01S 17/36* (2013.01); *H04N 5/374* (2013.01); *H04N 5/378* (2013.01)

(56) References Cited

U.S. PATENT DOCUMENTS

2015/0301177 A1   10/2015  Tsukamoto et al.
2016/0259057 A1*   9/2016  Ito .......................... G03B 13/36

FOREIGN PATENT DOCUMENTS

| | | |
|---|---|---|
| JP | 06-236497 A | 8/1994 |
| JP | 2007-170856 A | 7/2007 |
| JP | 2011-064498 A | 3/2011 |
| JP | 2015-232452 A | 12/2015 |
| WO | 2011/033971 A1 | 3/2011 |
| WO | 2014/119241 A1 | 8/2014 |
| WO | 2015/190308 A1 | 12/2015 |

* cited by examiner

IMAGING APPARATUS AND IMAGING CONTROL METHOD

CROSS REFERENCE TO RELATED APPLICATIONS

This application is a U.S. National Phase of International Patent Application No. PCT/JP2017/003732 filed on Feb. 2, 2017, which claims priority benefit of Japanese Patent Application No. JP 2016-026944 filed in the Japan Patent Office on Feb. 16, 2016. Each of the above-referenced applications is hereby incorporated herein by reference in its entirety.

TECHNICAL FIELD

The present technology relates to an imaging apparatus and an imaging control method, in particular to an imaging apparatus and an imaging control method that use Time of Flight (ToF).

BACKGROUND ART

Conventionally, a technology has been proposed in which a transmission signal modulated with a predetermined PN code is transmitted in a predetermined direction from a vehicle identification apparatus and correlation with a signal received from a vehicle is taken by using a code obtained by delaying the PN code by every predetermined bit length, so that vehicle information of a plurality of vehicles present at different distances in the aforementioned direction can be acquired at the same time (for example, see Patent Document 1).

CITATION LIST

Patent Document
Patent Document 1: Japanese Patent Application Laid-Open No. H06-236497

SUMMARY OF THE INVENTION

Problems to be Solved by the Invention

However, Patent Document 1 does not discuss changing of a measurement accuracy of a distance (a distance measuring accuracy) according to a distance from an imaging apparatus to an object.

The present technology is made in view of the above situation and makes it possible to change the distance measuring accuracy according to the distance from the imaging apparatus to the object.

Solutions to Problems

An imaging apparatus of an aspect of the present technology includes a control unit that controls outputs of an irradiation signal including an irradiation code used to control a pattern where irradiation light is emitted and a reference signal including a reference code that indicates a pattern used to detect correlation with reception light including reflected light of the irradiation light, and an imaging unit that includes a photoelectric conversion element, generates a pixel signal indicating correlation between the reception light incident into the photoelectric conversion element and the reference signal, and generates a distance pixel signal based on a distance to an object on the basis of a first ratio between a first pixel signal in a case where a first combination of the irradiation signal and the reference signal is used and a second pixel signal in a case where a second combination of the irradiation signal and the reference signal is used. Within a predetermined phase range, a first correlation function indicating correlation between the irradiation signal and the reference signal in the first combination and a second correlation function indicating correlation between the irradiation signal and the reference signal in the second combination are non-linear, and a sum of the first correlation function and the second correlation function in each phase can be substantially constant.

Either one code of the irradiation code and the reference code can be a code obtained by weighted-adding a plurality of unit codes of which phases are obtained by shifting a phase of a basic code of which cross-correlation with the other code has an impulse shape by different shift amounts, the one code in the first combination can be a code obtained by weighted-adding the plurality of unit codes by using a first weight, and the one code in the second combination can be a code obtained by weighted-adding the plurality of unit codes by using a second weight.

It is possible to cause the control unit to be able to control the first weight and the second weight.

Within the predetermined phase range, one of the first correlation function and the second correlation function can be a monotonically increasing function and the other can be a monotonically decreasing function.

It is possible to cause the imaging unit to generate the distance pixel signal on the basis of a second ratio between a third pixel signal in a case where a third combination of the irradiation signal and the reference signal is used and a fourth pixel signal in a case where a fourth combination of the irradiation signal and the reference signal is used, in addition to the first ratio. Within the predetermined phase range, a third correlation function indicating correlation between the irradiation signal and the reference signal in the third combination and a fourth correlation function indicating correlation between the irradiation signal and the reference signal in the fourth combination can be non-linear, and a sum of the third correlation function and the fourth correlation function in each phase can be substantially constant.

Periods of the first correlation function and the second correlation function can be made different from periods of the third correlation function and the fourth correlation function, and it is possible to cause a range where inclinations of the first correlation function and the second correlation function are steeper than inclinations of the third correlation function and the fourth correlation function and a range where the inclinations of the first correlation function and the second correlation function are gentler than the inclinations of the third correlation function and the fourth correlation function to be present.

An imaging control method of an aspect of the present technology includes the steps of: controlling outputs of an irradiation signal including an irradiation code used to control a pattern where irradiation light is emitted and a reference signal including a reference code that indicates a pattern used to detect correlation with reception light including reflected light of the irradiation light; and generating a pixel signal indicating correlation between the reception light incident into a photoelectric conversion element and the reference signal, and generating a distance pixel signal based on a distance to an object on the basis of a ratio between a first pixel signal in a case where a first combination of the irradiation signal and the reference signal is used and a second pixel signal in a case where a second combination of the irradiation signal and the reference signal is used, in which within a predetermined phase range, a first correlation function indicating correlation between the irradiation signal and the reference signal in the first combination and a second correlation function indicating correlation between the irradiation signal and the reference signal in the second combination are non-linear, and a sum of the first correlation function and the second correlation function in each phase is substantially constant.

In an aspect of the present technology, outputs of an irradiation signal including an irradiation code used to control a pattern where irradiation light is emitted and a reference signal including a reference code that indicates a pattern used to detect correlation with reception light including reflected light of the irradiation light are controlled, a pixel signal indicating correlation between the reception light incident into a photoelectric conversion element and the reference signal is generated, and a distance pixel signal based on a distance to an object is generated on the basis of a ratio between a first pixel signal in a case where a first combination of the irradiation signal and the reference signal is used and a second pixel signal in a case where a second combination of the irradiation signal and the reference signal is used. Within a predetermined phase range, a first correlation function indicating correlation between the irradiation signal and the reference signal in the first combination and a second correlation function indicating correlation between the irradiation signal and the reference signal in the second combination become non-linear, and a sum of the first correlation function and the second correlation function in each phase becomes substantially constant.

Effects of the Invention

According to an aspect of the present technology, it is possible to change the distance measuring accuracy according to the distance from the imaging apparatus to the object.

Note that the effects described in the present description are merely examples. The effects of the present technology are not limited to the effects described in the present description and there may be additional effects.

MODE FOR CARRYING OUT THE INVENTION

Hereinafter, an embodiment for carrying out the present technology (hereinafter simply referred to as an embodiment) will be described. Here, the order of description is as follows:
1. Embodiment
2. Modified Example
3. Usage Example of Imaging Apparatus 1. Embodiment {Configuration Example of Imaging Apparatus 11}

Figure 1:
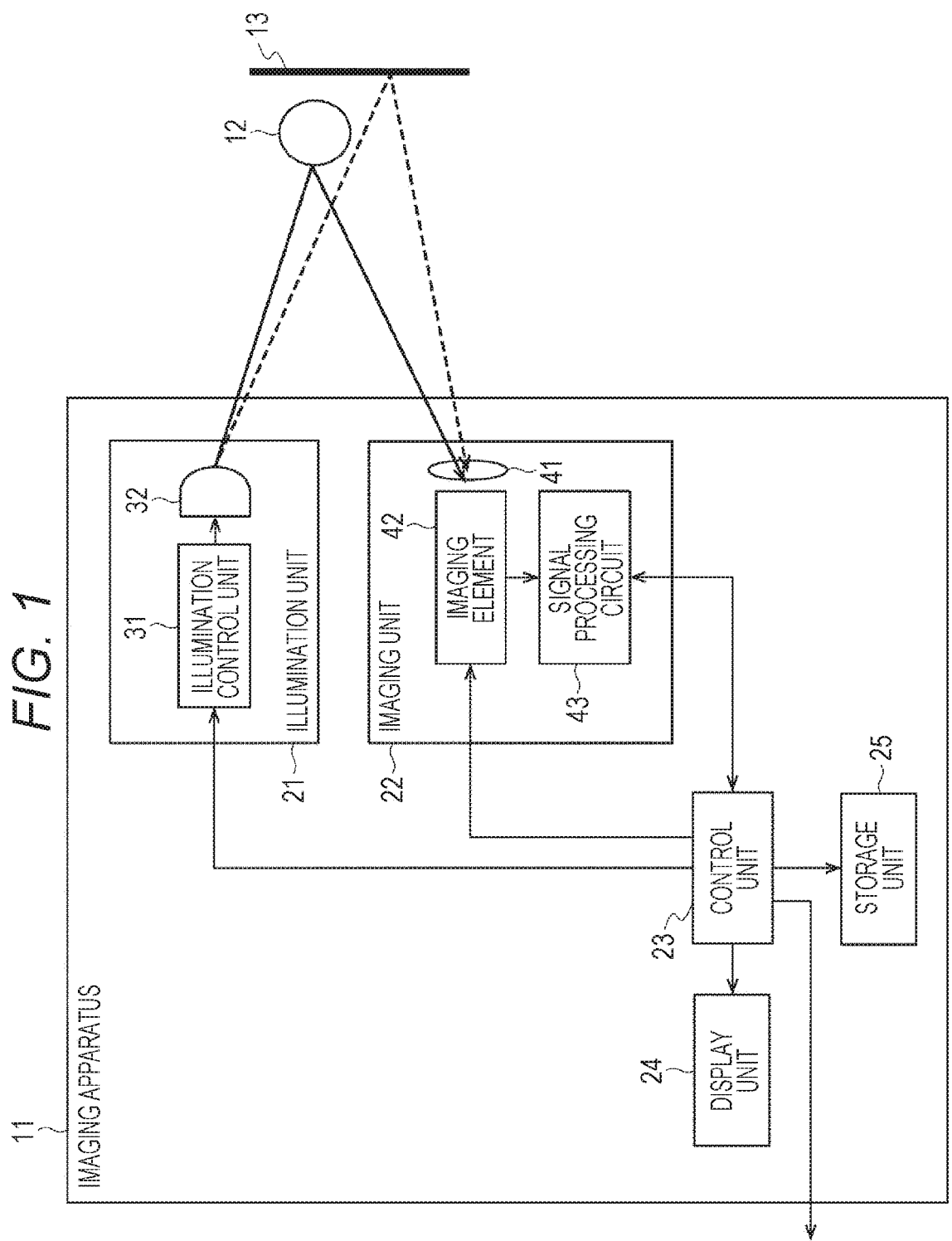
FIG. 1 is a block diagram showing a configuration example of an imaging apparatus to which the present technology is applied.

FIG. 1 is a block diagram showing an embodiment of an imaging apparatus to which the present technology is applied. The imaging apparatus 11 is an apparatus that captures a distance image by using, for example, a ToF method. Here, the distance image is an image formed by detecting a distance in a depth direction from the imaging apparatus 11 to an object for each pixel and obtaining distance pixel signals based on the detected distances.

The imaging apparatus 11 includes an illumination unit 21, an imaging unit 22, a control unit 23, a display unit 24, and a storage unit 25.

The illumination unit 21 includes an illumination control unit 31 and a light source 32.

The illumination control unit 31 controls a pattern, where the light source 32 emits irradiation light, under control of the control unit 23. Specifically, the illumination control unit 31 controls the pattern, where the light source 32 emits irradiation light, according to an irradiation code included in an irradiation signal supplied from the control unit 23. For example, the irradiation code is a binary value which is 1 (High) or 0 (Low). When the value of the irradiation code is 1, the illumination control unit 31 causes the light source 32 to emit light, and when the value of the irradiation code is 0, the illumination control unit 31 causes the light source 32 not to emit light.

The light source 32 emits light (irradiation light) of a predetermined wavelength region under control of the illumination control unit 31. The light source 32 includes, for example, an infrared laser diode. Here, the type of the light source 32 and the wavelength region of the irradiation light can be arbitrarily set according to usage and the like of the imaging apparatus 11.

The imaging unit 22 includes a lens 41, an imaging element 42, and a signal processing circuit 43.

The lens 41 forms an image of incident light on an imaging surface of the imaging element 42. Here, the configuration of the lens 41 can be arbitrarily determined, and for example, a plurality of lenses can constitute the lens 41.

The imaging element 42 includes, for example, a complementary metal oxide semiconductor (CMOS) image sensor using the ToF method. The imaging element 42 captures images, under control of the control unit 23, of a subject 12, a subject 13, and the like and supplies a pixel signal obtained accordingly to the signal processing circuit 43. Specifically, the imaging element 42 generates a pixel signal indicating correlation between a reference signal supplied from the control unit 23 and reception light including reflection right generated when irradiation light emitted from the light source 32 is reflected by the subject 12, the subject 13, and the like, and supplies the signal to the signal processing circuit 43.

Here, the reference signal includes a reference code indicating a pattern that is used to detect correlation with reception light.

The signal processing circuit 43 performs processing of a pixel signal supplied from the imaging element 42 under control of the control unit 23. For example, the signal processing circuit 43 generates a distance image on the basis of the pixel signal supplied from the imaging element 42. The signal processing circuit 43 supplies the distance image to the control unit 23.

The control unit 23 includes a control circuit, a processor, and the like such as, for example, a field programmable gate array (FPGA), a digital signal processor (DSP), and the like. The control unit 23 performs control of the illumination control unit 31, the imaging element 42, and the signal processing circuit 43. Further, the control unit 23 supplies a distance image acquired from the imaging unit 22 to the display unit 24 and causes the display unit 24 to display the distance image. Further, the control unit 23 causes the storage unit 25 to store the distance image acquired from the imaging unit 22. Further, the control unit 23 outputs the distance image acquired from the imaging unit 22 to the outside.

The display unit 24 includes a panel type display apparatus such as, for example, a liquid crystal display apparatus and an organic electro luminescence (EL) display apparatus.

The storage unit 25 can include an arbitrary storage apparatus, an arbitrary storage medium, or the like. The storage unit 25 stores distance images and the like.

{Configuration Example of Imaging Element 42}

Figure 2:
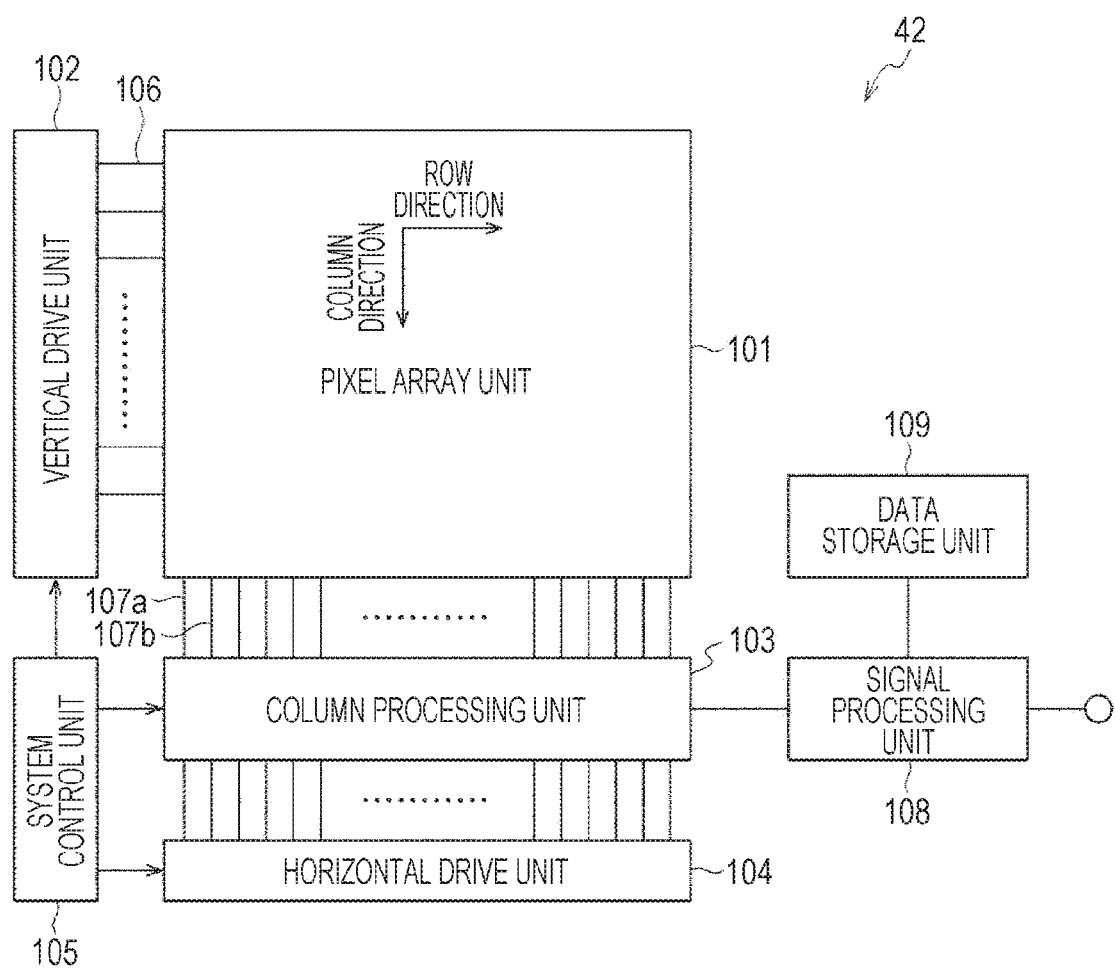
FIG. 2 is a block diagram showing a configuration example of an imaging element.

FIG. 2 shows a configuration example of the imaging element 42.

The imaging element 42 is configured so as to include a pixel array unit 101, a vertical drive unit 102, a column processing unit 103, a horizontal drive unit 104, a system control unit 105, pixel drive lines 106, vertical signal lines 107a and 107b, a signal processing unit 108, and a data storage unit 109.

The pixel array unit 101 includes pixels, each of which has a photoelectric conversion element that generates and accumulates an electric charge in accordance with the amount of light incident from an object. The pixels included in the pixel array unit 101 are two-dimensionally arranged in the horizontal direction (row direction) and the vertical direction (column direction) in FIG. 2.

For example, in the pixel array unit 101, the pixel drive line 106 is wired along the row direction for each pixel row including pixels arranged in the row direction, and the vertical signal lines 107a and 107b are wired along the column direction for each pixel column including pixels arranged in the column direction.

The vertical drive unit 102 includes a shift register, an address decoder, and the like, and drives all the pixels of the pixel array unit 101 at the same time or drives pixels in one row or the like at a time by supplying a signal or the like to each pixel through a plurality of pixel drive lines 106.

The column processing unit 103 reads a signal from each pixel through the vertical signal lines 107a and 107b for each pixel column of the pixel array unit 101 and generates a pixel signal by performing noise removing processing, correlative double sampling processing, analog to digital (A/D) conversion processing, and the like.

The horizontal drive unit 104 includes a shift register, an address decoder, and the like, and sequentially selects a unit circuit corresponding to a pixel column of the column processing unit 103. By the selective scanning of the horizontal drive unit 104, a pixel signal that is signal-processed for each unit circuit in the column processing unit 103 is sequentially outputted to the signal processing unit 108.

The system control unit 105 includes a timing generator that generates various timing signals or the like, and performs drive control of the vertical drive unit 102, the column processing unit 103, and the horizontal drive unit 104 on the basis of the timing signals generated by the timing generator.

The signal processing unit 108 performs signal processing such as arithmetic processing on the pixel signals supplied from the column processing unit 103 while temporarily storing data into the data storage unit 109 as needed, and outputs an image signal including the pixel signals.

{Configuration Example of Unit Pixel 151}

Figure 3:
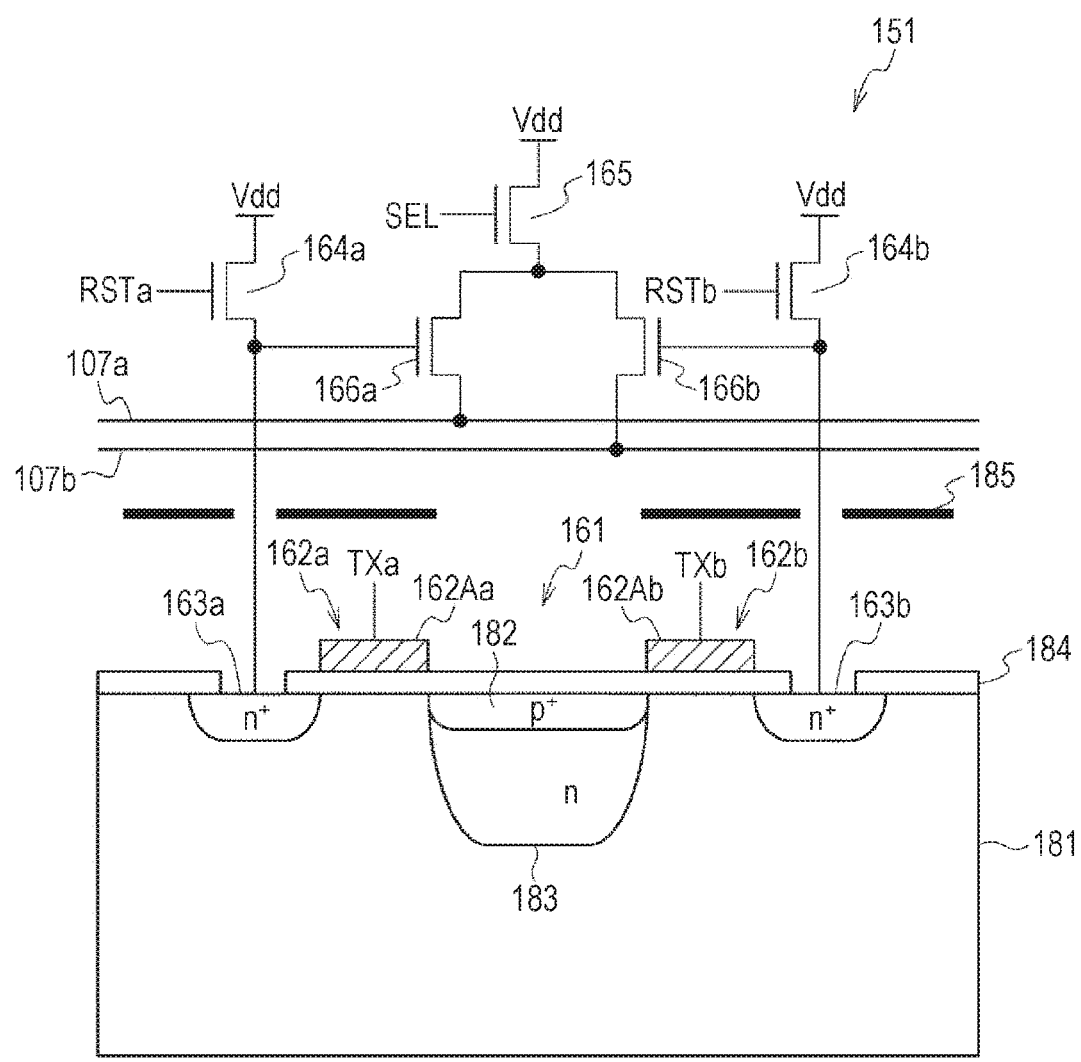
FIG. 3 is a schematic diagram of a cross-section of a unit pixel.
Figure 4:
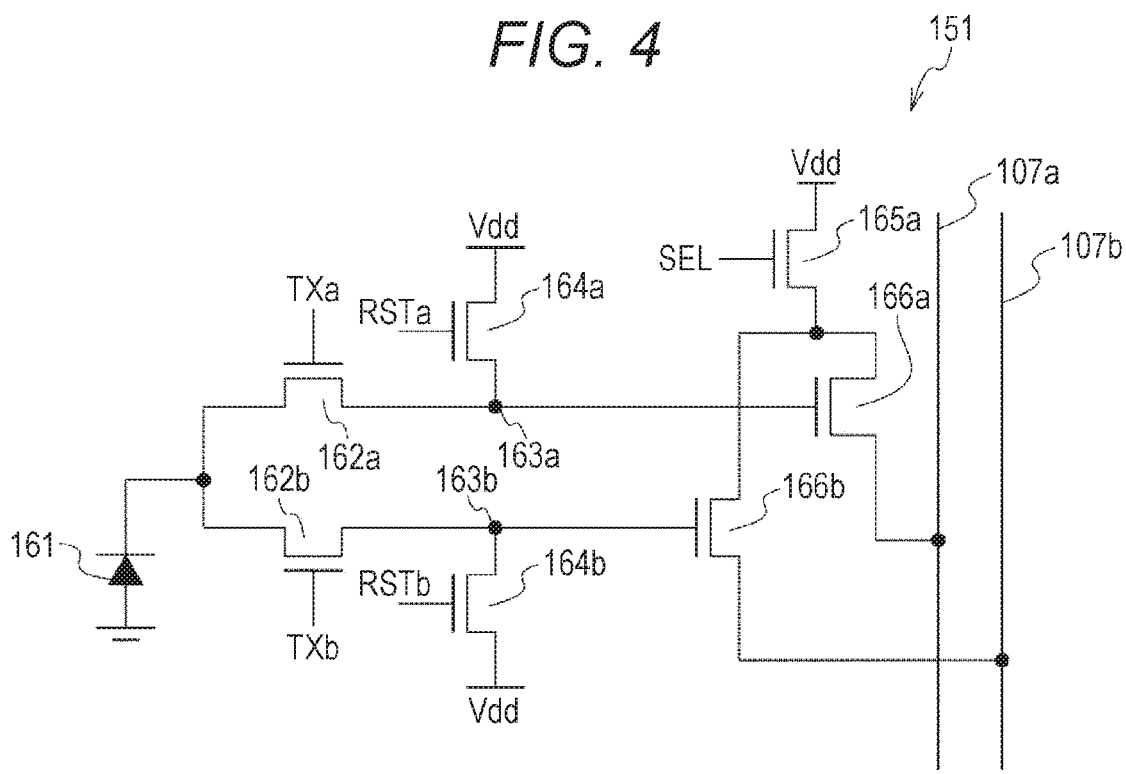
FIG. 4 is an equivalent circuit of the unit pixel.

Next, a configuration example of a unit pixel 151 included in the pixel array unit 101 of the imaging element 42 will be described with reference to FIGS. 3 and 4. FIG. 3 is a schematic diagram of a cross-section of the unit pixel 151. FIG. 4 is an equivalent circuit of the unit pixel 151.

The unit pixel 151 includes a photoelectric conversion element 161, transfer gates 162a and 162b, a floating diffusion regions (FDs) 163a and 163b, reset transistors 164a and 164b, a selection transistor 165, and amplification transistors 166a and 166b.

Here, FIGS. 3 and 4 show an example in which N-channel MOS transistors are used as the reset transistors 164a and 164b, the selection transistor 165, and the amplification transistors 166a and 166b. However, a combination of conductivity types of the reset transistors 164a and 164b, the selection transistor 165, and the amplification transistors 166a and 166b is not limited to this example.

The photoelectric conversion element 161 includes, for example, a buried photodiode. Specifically, the photoelectric conversion element 161 is formed by forming a p-type layer 182 on a surface of a p-type semiconductor substrate 181 and burying an n-type buried layer 183 into the p-type semiconductor substrate 181.

The transfer gate 162a includes a gate electrode 162Aa. The gate electrode 162Aa is formed so as to cover a region between the photoelectric conversion element 161 and the FD 163a through an insulating film 184 formed on the surface of the semiconductor substrate 181. A transfer signal TXa is supplied to the gate electrode 162Aa from the vertical drive unit 102 through the pixel drive line 106. Then, when a voltage of the transfer signal TXa is set to a predetermined high level and the transfer gate 162a becomes a conductive state, an electric charge generated by the photoelectric conversion element 161 is transferred to the FD 163a through the transfer gate 162a.

The transfer gate 162b includes a gate electrode 162Ab. The gate electrode 162Ab is formed so as to cover a region between the photoelectric conversion element 161 and the FD 163b through the insulating film 184 formed on the surface of the semiconductor substrate 181. A transfer signal TXb is supplied to the gate electrode 162Ab from the vertical drive unit 102 through the pixel drive line 106. Then, when a voltage of the transfer signal TXb is set to a predetermined high level and the transfer gate 162b becomes a conductive state, an electric charge generated by the photoelectric conversion element 161 is transferred to the FD 163b through the transfer gate 162b.

Here, the transfer signal TXa is the same signal as a reference signal supplied from the control unit 23 to the system control unit 105, and the transfer signal TXb is a signal obtained by inverting bits of the reference signal. Therefore, the electric charge generated by the photoelectric conversion element 161 is distributed to the FD 163a and FD 163b. Furthermore, the higher the correlation between the reception light incident into the photoelectric conversion element 161 and the reference signal, the larger the amount of electric charge that is transferred and accumulated in the FD 163a and the smaller the amount of electric charge that is transferred and accumulated in the FD 163b, and therefore the difference between them increases. On the other hand, the lower the correlation between the reception light incident into the photoelectric conversion element 161 and the reference signal, the smaller the difference between the amount of electric charge that is transferred and accumulated in the FD 163a and the amount of electric charge that is transferred and accumulated in the FD 163b.

The insulating film 184 is formed so as to cover the entire surface of the semiconductor substrate 181 except for a part of an upper portion of the FD163a and a part of an upper portion of the FD163b.

A light shielding film 185 is formed so as to cover above the entire portion of the semiconductor substrate 181, except for a portion above the photoelectric conversion element 161, a portion above apart of the FD163a, and a portion above a part of the FD163b.

The FD 163a accumulates the electric charge transferred from the photoelectric conversion element 161 through the transfer gate 162a and converts the accumulated electric charge into a voltage.

The FD 163b accumulates the electric charge transferred from the photoelectric conversion element 161 through the transfer gate 162b and converts the accumulated electric charge into a voltage.

The drain electrode of the reset transistor 164a is connected to a pixel power supply Vdd, and the source electrode of the reset transistor 164a is connected to the FD 163a and the gate electrode of the amplification transistor 166a. A reset signal RSTa is supplied to the gate electrode of the reset transistor 164a from the vertical drive unit 102 through the pixel drive line 106. Then, when a voltage of the reset signal RSTa is set to a predetermined high level and the reset transistor 164a turns on, the FD 163a is reset and an electric charge is discharged from the FD 163a.

The drain electrode of the reset transistor 164b is connected to the pixel power supply Vdd, and the source electrode of the reset transistor 164b is connected to the FD 163b and the gate electrode of the amplification transistor 166b. A reset signal RSTb is supplied to the gate electrode of the reset transistor 164b from the vertical drive unit 102 through the pixel drive line 106. Then, when a voltage of the reset signal RSTb is set to a predetermined high level and the reset transistor 164b turns on, the FD 163b is reset and an electric charge is discharged from the FD 163b.

The drain electrode of the selection transistor 165 is connected to the pixel power supply Vdd, and the source electrode of the selection transistor 165 is connected to the drain electrode of the amplification transistor 166a and the drain electrode of the amplification transistor 166b. The source electrode of the amplification transistor 166a is connected to the vertical signal line 107a. The source electrode of the amplification transistor 166b is connected to the vertical signal line 107b.

A selection signal SEL is supplied to the gate electrode of the selection transistor 165 from the vertical drive unit 102 through the pixel drive line 106. Then, a voltage of the selection signal SEL is set to a predetermined high level and the selection transistor 165 turns on, so that a unit pixel 151 from which a pixel signal is read is selected. Specifically, when the selection transistor 165 is on, the amplification transistor 166a supplies a signal Spa indicating a voltage of the FD 163a to the column processing unit 103 through the vertical signal line 107a. When the selection transistor 165 is on, the amplification transistor 166b supplies a signal Spb indicating a voltage of the FD 163b to the column processing unit 103 through the vertical signal line 107b.

Then, the signal processing unit 108 of the imaging element 42 generates a differential signal between the signal SPa and the signal SPb that are supplied from each unit pixel 151 through the column processing unit 103. Further, the signal processing unit 108 supplies the differential signal to the signal processing circuit 43 as a pixel signal of each unit pixel 151. Therefore, the pixel signal outputted from the imaging element 42 is a signal indicating correlation between the reference signal and the reception light of each unit pixel 151. That is to say, the higher the correlation between the reference signal and the reception light, the greater the value of the pixel signal, and the lower the correlation between the reference signal and the reception light, the smaller the value of the pixel signal.

{Processing of Imaging Apparatus 11}

Next, processing of the imaging apparatus 11 will be described with reference to FIGS. 5 to 15.

The imaging apparatus 11 generates a distance image by performing image capturing a plurality of times by using different combinations of the irradiation signal and the reference signal.

First, a first example of a method of generating a distance image will be described with reference to FIGS. 5 and 6.

Figure 5:
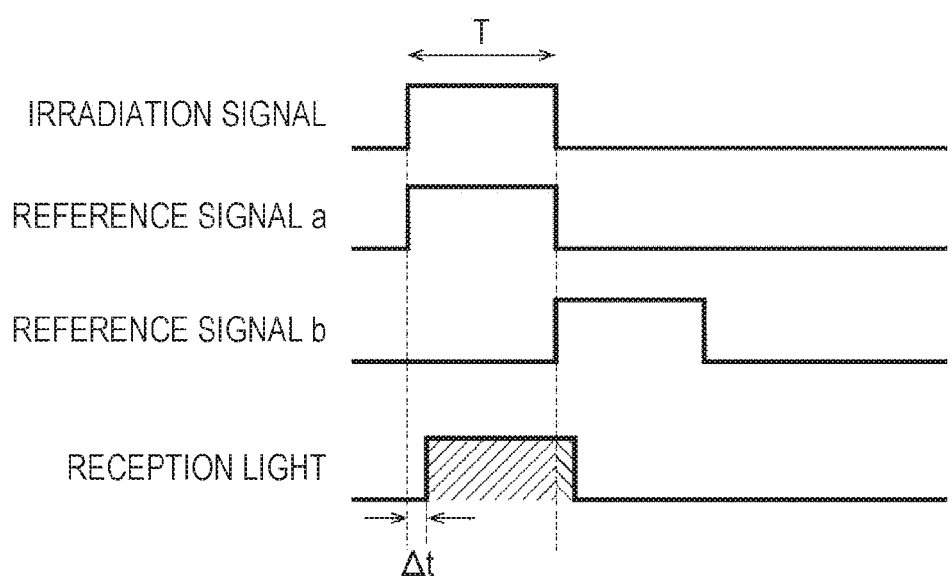
FIG. 5 is a timing chart for explaining a first example of a method of generating a distance image.

FIG. 5 shows timing charts of the irradiation signal, a reference signal a, a reference signal b, and the reception light. The horizontal axis indicates time.

Figure 6:
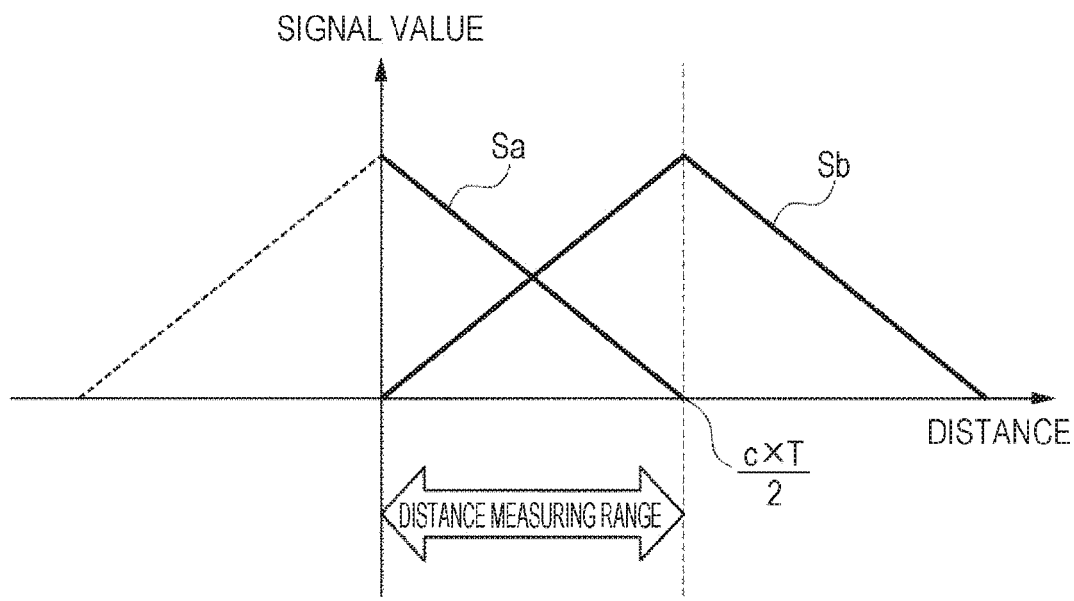
FIG. 6 is a graph showing a first example of a waveform of a pixel signal.

FIG. 6 is a graph schematically showing a relationship between a distance to an object and a pixel signal outputted from a unit pixel 151. The horizontal axis of FIG. 6 indicates the distance to the object, and the vertical axis indicates a value of the pixel signal.

In this example, a combination of the irradiation signal and the reference signal a is used at first image capturing. The irradiation signal and the reference signal a are signals having the same phase and pulse width T. The irradiation light emitted from the light source 32 has substantially the same waveform as that of the irradiation signal.

A part of the irradiation light emitted from the light source 32 is reflected by the object located in an irradiation direction, and a part of the reflected light enters the photoelectric conversion element 161 of each unit pixel 151 of the imaging element 42. Here, the reception light entering the photoelectric conversion element 161 enters the photoelectric conversion element 161 a delay time Δt later with respect to the irradiation signal (irradiation light) according to the distance between the imaging apparatus 11 and the object.

At this time, a value of a pixel signal Sa outputted from the unit pixel 151 is proportional to time where the reference signal a and the reception light are overlapped with each other. Specifically, the value of the pixel signal Sa becomes maximum at time 0 on the basis of rise of a pulse of the reference signal a (when the time of rise of the pulse of the reference signal a is defined as 0) and is proportional to time T−Δt. Then, when the delay time Δt becomes greater than or equal to the pulse width T, the value of the pixel signal Sa becomes 0.

A combination of the irradiation signal and the reference signal b is used at second image capturing. The reference signal b has a waveform of which phase is delayed by the time same as pulse width T as compared to the reference signal a.

At this time, a value of a pixel signal Sb outputted from the unit pixel 151 is proportional to time where the reference signal b and the reception light are overlapped with each other. Specifically, the value of the pixel signal Sb is proportional to the delay time Δt when the delay time Δt is between 0 and T, and is proportional to 2T−Δt when the delay time Δt is between T and 2T. Then, when the delay time Δt is greater than or equal to 2T, the value of the pixel signal Sb is 0.

Here, the reception light includes the reflected light of the irradiation light irradiated with the same pattern as that of the irradiation signal (irradiation code), and a waveform of the reception light is similar to a waveform obtained by shifting the phase of the irradiation signal. Therefore, the waveform of the pixel signal Sa in FIG. 6 is similar to a waveform of a correlation function between the reference signal a and the irradiation signal, and the waveform of the pixel signal Sb in FIG. 6 is similar to a waveform of a correlation function between the reference signal b and the irradiation signal. Further, the waveform of the pixel signal Sa here indicates a waveform including an area where the distance has a negative value and the waveform is indicated by a dashed line in FIG. 6.

Furthermore, the distance to the object is proportional to a ratio of the pixel signal Sb to the sum of the pixel signal Sa and the pixel signal Sb as shown by the following formula (1):

[Expression 1]

$$\text{Distance} \propto \frac{Sb}{Sa + Sb} \quad (1)$$

For example, the signal processing circuit 43 generates a distance pixel signal based on the distance to the subject for each pixel on the basis of the ratio of the pixel signal Sb to the sum of the pixel signal Sa and the pixel signal Sb and generates a distance image including the distance pixel signals. Then, it becomes possible to, for example, measure a distance to the subject for each pixel or recognize a difference of distances on the basis of the distance image.

Here, as shown in FIG. 6, a measurement accuracy of a distance (a distance measuring accuracy) is constant regardless of the distance because the inclinations of the pixel signal Sa and the pixel signal Sb with respect to the distance are constant.

Further, a range in which a distance can be measured (a distance measuring range) is a range until the pixel signal Sa becomes 0, specifically a range from 0 to c×T/2.

Figure 7:
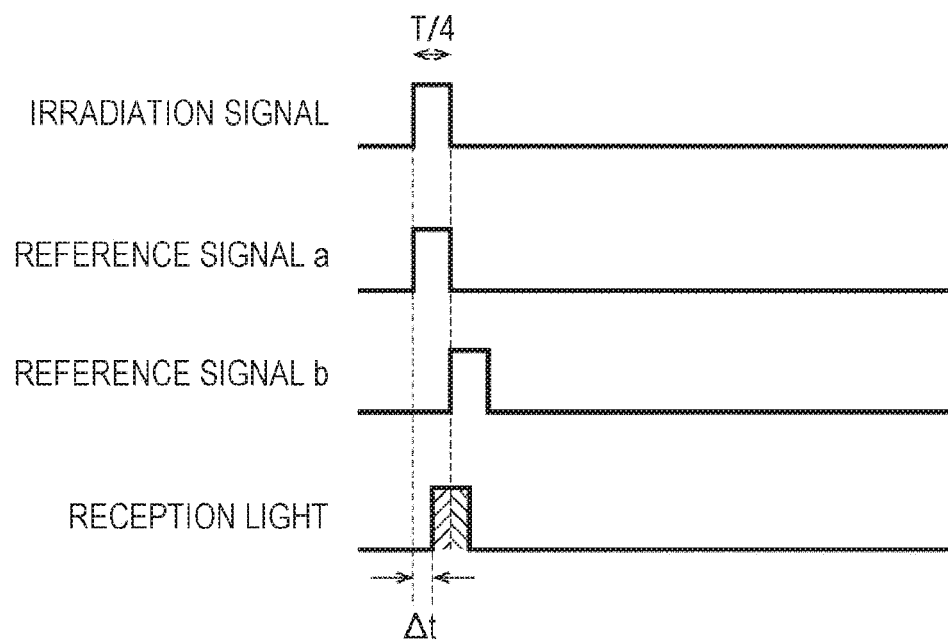
FIG. 7 is a timing chart for explaining a second example of a method of generating a distance image.
Figure 8:
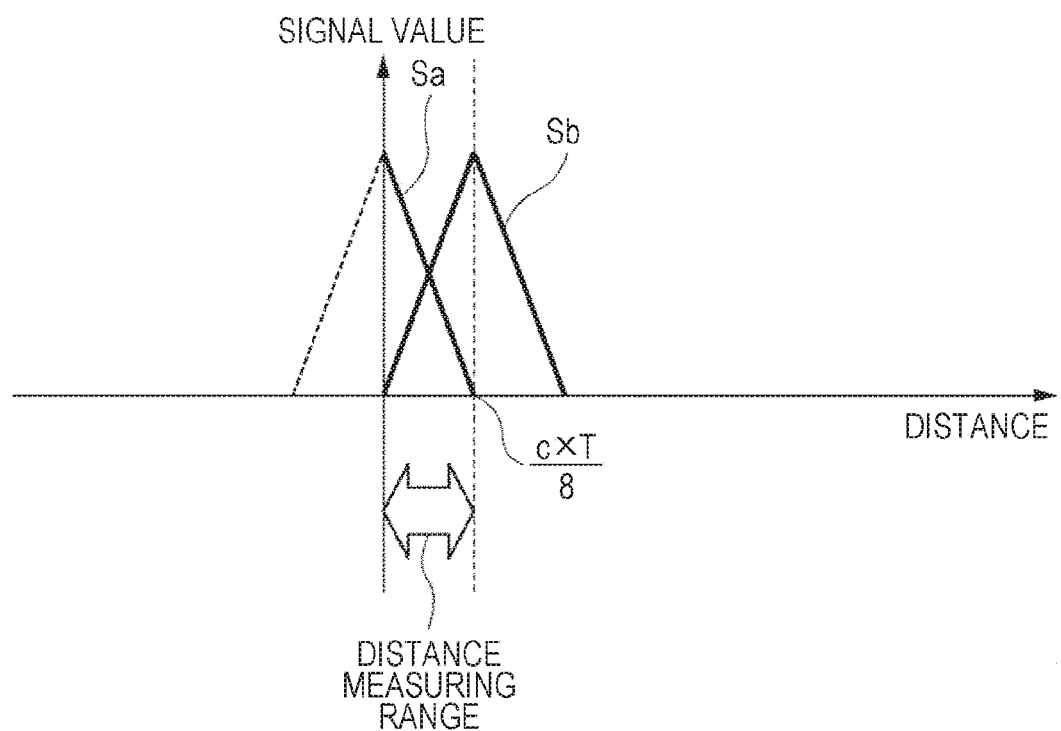
FIG. 8 is a graph showing a second example of a waveform of a pixel signal.

FIGS. 7 and 8 show an example of a case where pulse widths of the irradiation signal, the reference signal a, and the reference signal b are set to ¼ with respect to the example of FIGS. 5 and 6.

FIG. 7 shows timing charts of the irradiation signal, the reference signal a, the reference signal b, and the reception light in a similar manner as FIG. 5. FIG. 8 is a graph schematically showing a relationship between a distance to an object and a pixel signal outputted from a unit pixel 151 in a similar manner as FIG. 6.

As shown in FIG. 8, the inclinations of the pixel signal Sa and the pixel signal Sb are made steep as compared with the example of FIG. 6 by shortening the pulse widths of the irradiation signal, the reference signal a, and the reference signal b. Thereby, the distance measuring accuracy is improved. However, the distance measuring accuracy is constant regardless of the distance because the inclinations of the pixel signal Sa and the pixel signal Sb with respect to the distance are constant.

On the other hand, the distance measuring range is from 0 to c×T/8 and therefore is narrower than that in the example of FIG. 6.

As described above, in a case where the irradiation signal and the reference signal that have a pulse shape are used, the distance measuring accuracy degrades when increasing the distance measuring range, and the distance measuring range narrows when improving the distance measuring accuracy. Further, the distance measuring accuracy is constant regardless of the distance to the object in the distance measuring range.

On the other hand, there may be a case where it is desirable to change the distance measuring accuracy according to the distance to the object. For example, in a case where gesture detection, three-dimensional shape measurement, or the like is performed, it is desirable that the smaller the distance from the imaging apparatus 11, the higher the distance measuring accuracy is to be set. On the other hand, for example, by considering that the greater the distance, the lower the amount of irradiation light and the lower the distance measuring accuracy, there may be a case where it is desirable to increase the distance measuring accuracy as the distance from the imaging apparatus 11 increases.

Therefore, hereinafter, a method for changing the distance measuring accuracy according to the distance to the object within a desired distance measuring range will be described.

First, as a code of either one of the irradiation code and the reference code, a predetermined code (hereinafter referred to as a basic code A) is used without change. On the other hand, as the other code, a code obtained by weighted-adding a plurality of unit codes of which phases are different from each other and which are obtained by shifting a phase of a predetermined code (hereinafter referred to as a basic code B) is used. Here, the unit code may include a code of which phase is not shifted from the phase of the basic code B and is used without change (that is, the same code as the basic code B).

The basic code A and the basic code B may be set to the same code or different codes as long as the following condition is satisfied. The condition is to set the basic code A and the basic code B so that a waveform of a correlation function of the basic code A and the basic code B has an impulse shape as shown in FIG. 9.

Figure 9:
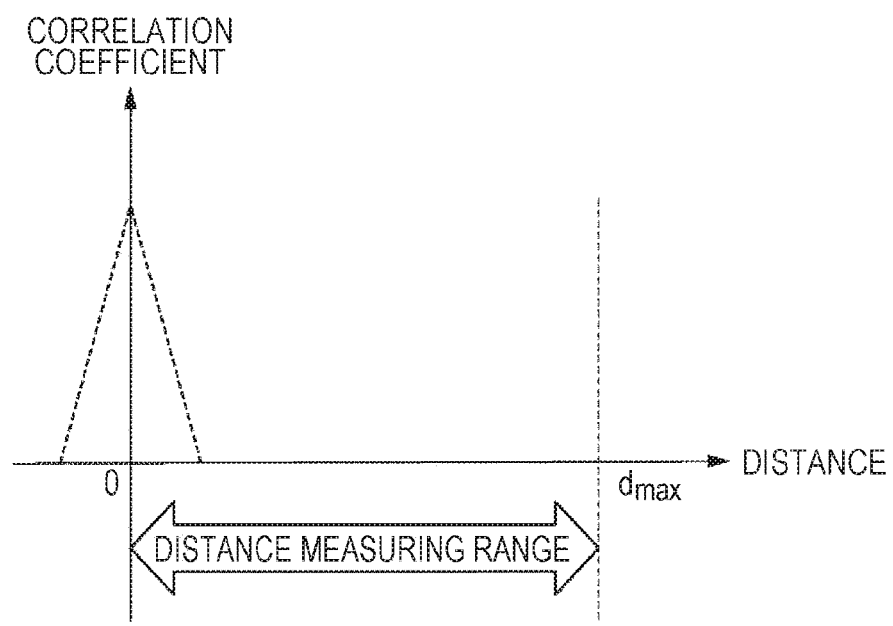
FIG. 9 is a diagram for explaining a condition of a basic code.

Here, the horizontal axis of FIG. 9 indicates a distance, and the vertical axis indicates a correlation coefficient. Here, the correlation function of the basic code A and the basic code B is given as, for example, a function of a phase difference Δt. However, here, the correlation function is represented as a function of a distance by converting the phase difference Δt into a distance (=c×Δt/2).

Figure 10:
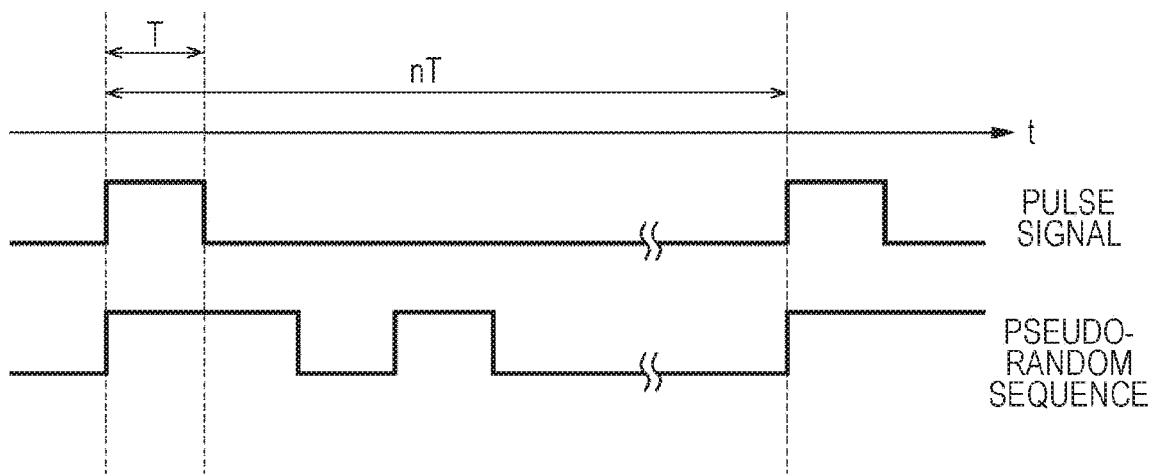
FIG. 10 is a diagram showing an example of a basic code.

For example, as a code that satisfies the above condition, as shown by the upper part of FIG. 10, it is possible to set the basic code A and the basic code B to the same pulse signal. In other words, it is possible to set the basic code A and the basic code B to a signal including a pulse of the same pulse width and phase. Further, for example, as shown by the lower part of FIG. 10, it is possible to set the basic code A and the basic code B to a pseudo-random sequence (for example, M-sequence) of the same value.

Furthermore, hereinafter a case where the basic code A and the basic code B are set to the same pulse signal will be described as an example. Therefore, the basic code A and the basic code B are the same code, hereinafter, they are simply referred to as a basic code. Further, hereinafter, a pulse width T of the basic code is defined as a width of one bit of a clock signal of the imaging apparatus 11. Further, hereinafter, a case where the basic code is used as the reference code and a code obtained by weighted-adding unit codes is used as the irradiation code will be described.

For example, in a case where the phase of the unit code coincides with that of the basic code, that is, in a case where the unit code coincides with the basic code, a waveform of a correlation function of the reference code (=the basic code) and the unit code is the same as the waveform shown in FIG. 9. On the other hand, in a case where the phase of the unit code is shifted from the phase of the basic code, the waveform of the correlation function of the reference code and the unit code is shifted by the amount of phase shift of the unit code. Further, when the unit code is multiplied by a weight w, a peak of the waveform of the correlation function of the reference code and the unit code increases or decreases according to the weight w.

Figure 11A:
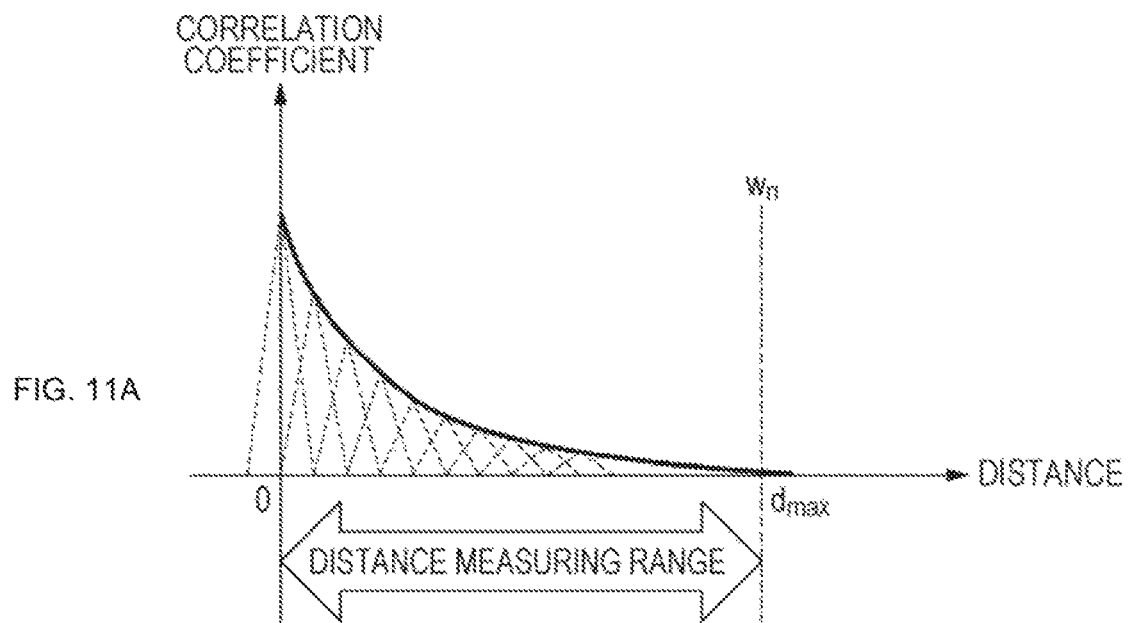
FIGS. 11A and 11B are graphs showing a first example of a correlation function.
Figure 11B:
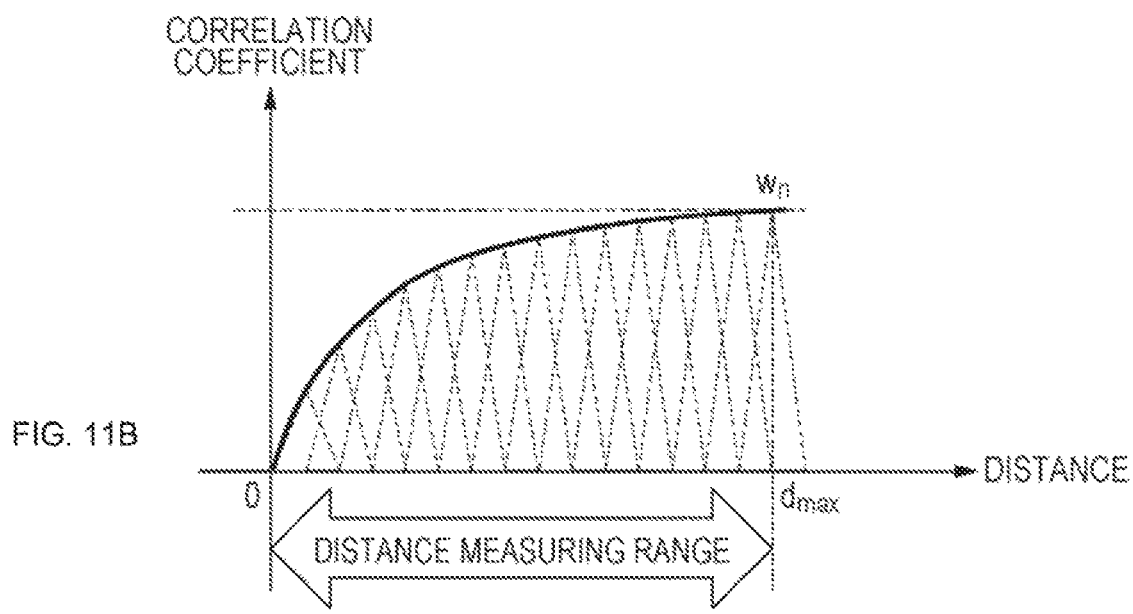

FIG. 11A and FIG. 11B show an example of a correlation function of the reference signal and the irradiation signal in a case where an irradiation code obtained by weighted-adding unit codes of which phases are shifted from the basic code by i bits (i=0, 1, 2, . . . , n) by using weights wi (i=0, 1, 2, . . . , n) is used.

Here, the horizontal axes of FIG. 11A and FIG. 11B indicate a distance, and the vertical axes indicate a correlation coefficient. Here, the correlation function of the irradiation signal and the reference signal is given as, for example, a function of a phase difference Δt. However, here, the correlation function is represented as a function of a distance by converting the phase difference Δt into a distance d (=c×Δt/2).

FIG. 11A shows a correlation function ha(d) of the reference signal and the irradiation signal in a case where the weight wi is set so that w0>w1>w2> . . . wn−1>wn=0 is established. Each triangle waveform indicated by dashed lines in FIG. 11A indicates a waveform of a correlation function of the reference code and the unit code of each phase. Furthermore, by connecting peaks of the waveforms, the correlation function ha(d) indicated by a solid line waveform is approximated. The correlation function ha(d) is a monotonically decreasing function which has a peak when the distance is 0 and decreases as the distance increases in a distance measuring range up to a distance dmax. Here, the distance dmax is equal to c×nT/2.

FIG. 11B shows a correlation function hb(d) of the reference signal and the irradiation signal in a case where the weight wi is set so that w0=0<w1<w2< . . . wn−1<wn is established. Each triangle waveform indicated by dashed lines in FIG. 11B indicates a waveform of a correlation function of the reference code and each unit code. Furthermore, by connecting peaks of the waveforms, the correlation function hb(d) indicated by a solid line waveform is approximated. The correlation function hb(d) is a monotonically increasing function which is 0 when the distance is 0 and increases as the distance increases in a distance measuring range up to the distance dmax.

Furthermore, hereinafter in a case where the weight $w_i$ for the correlation function ha(d) and the weight $w_i$ for the correlation function hb(d) are differentiated, the former is defined as $wa_i$ and the latter is defined as $wb_i$.

Here, the weight $wa_i$+ the weight $wb_i$ is set to a constant value so that a value of the correlation function ha(d)+ the correlation function hb(d) is constant in the distance measuring range. Therefore, the value of the correlation function ha(d)+ the correlation function hb(d) is constant in a range of phase corresponding to the distance measuring range.

Here, FIGS. 11A and 11B show an example of a case where the weight wbi and the weight wai are set so that the correlation functions hb(d) and ha(d) are functions of the following formulas (2) and (3).

[Expression 2]

$$hb(d) = \alpha \sqrt{\frac{d}{d_{max}}} \quad (2)$$

$$ha(d) = \alpha - hb(d) \quad (3)$$

Therefore, the correlation functions ha(d) and hb(d) are non-linear in the distance measuring range, the smaller the distance d, the steeper the inclination (the larger the absolute value of the inclination), and the larger the distance d, the gentler the inclination (the smaller the absolute value of the inclination).

Here, when a pixel signal in a case where the reference signal and the irradiation signal corresponding to the correlation function ha(d) are used is defined as Sa, as described above, a waveform of the pixel signal Sa is similar to the waveform of the correlation function ha(d). Further, when a pixel signal in a case where the reference signal and the irradiation signal corresponding to the correlation function hb(d) are used is defined as Sb, as described above, a waveform of the pixel signal Sb is similar to the waveform of the correlation function hb(d). Furthermore, as shown in the following formula (4), the distance d to the object is obtained on the basis of a value obtained by multiplying the square of a ratio of the pixel signal Sb to the sum of the pixel signal Sa and the pixel signal Sb by the distance dmax.

[Expression 3]

$$d \approx \left(\frac{Sb}{Sa+Sb}\right)^2 \cdot d_{max} \quad (4)$$

Then, for example, the signal processing circuit 43 generates a distance pixel signal based on the formula (4) for each pixel, and generates a distance image including the distance pixel signals.

Here, as described above, the smaller the distance d, the steeper the inclinations of the correlation functions ha(d) and hb(d), and the larger the distance d, the gentler the inclinations. Therefore, the smaller the distance d to the object, the higher the distance measuring accuracy, and the larger the distance d to the object, the lower the distance measuring accuracy.

Next, a method of weighted addition of unit codes will be described with reference to FIGS. 12 to 15.

Figure 12:
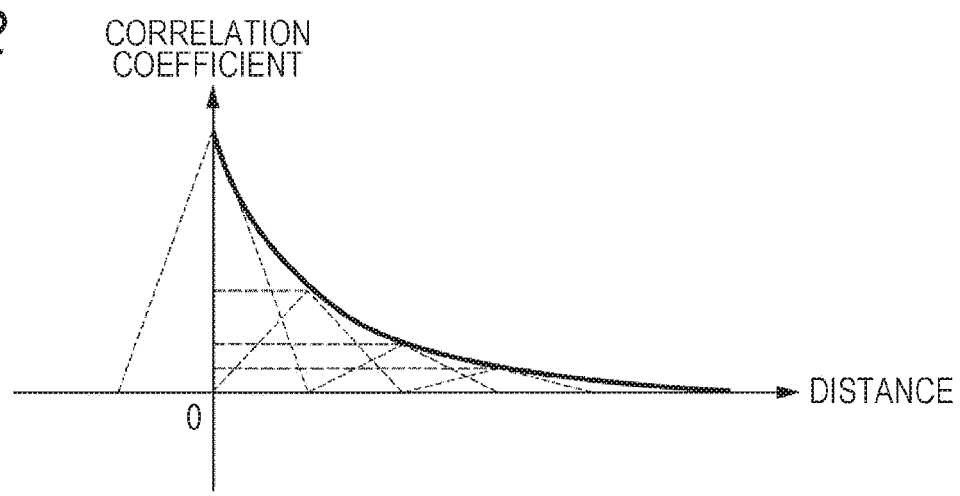
FIG. 12 is a graph showing a second example of a correlation function.

For example, an example of a case where a correlation function of the reference signal and the irradiation signal is set to a correlation function shown in FIG. 12 will be described. In this example, an example of a correlation function in a case where the weight $w_0=8$ is set, the weight $w_1=4$ is set, the weight $w_2=2$ is set, and the weight $w_3=1$ is set, is shown.

Figure 13:
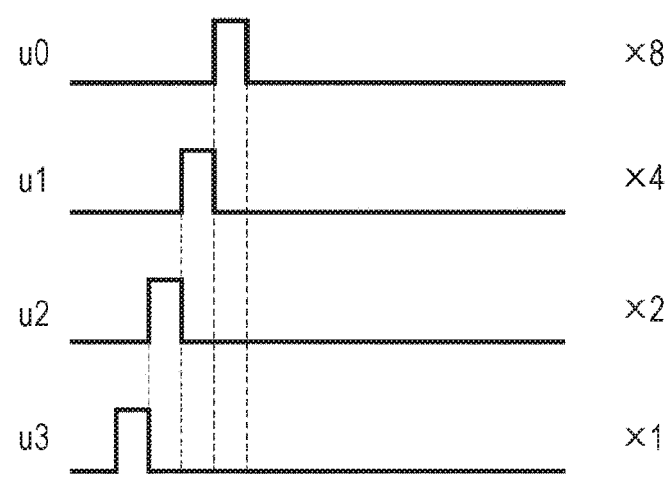
FIG. 13 is a graph showing a first example of a unit code.

In the correlation function, for example, as shown in the following formula (5), the irradiation code c is obtained by weighted-adding the unit codes $u_0$ to $u_3$ of FIG. 13.

$$c=w_0 \times u_0 + w_1 \times u_1 + w_2 \times u_2 + w_3 \times u_3 \qquad (5)$$

Here, the unit coder $u_0$ is a code of which phase is the same as that of the basic code. The unit codes $u_1$ to $u_3$ are codes of which phases are advanced by one bit, two bits, and three bits, respectively, from the phase of the basic code.

Here, for example, the weighted addition of the formula (5) may be realized by performing addition in a value direction or may be realized by performing addition in a time direction.

Figure 14:
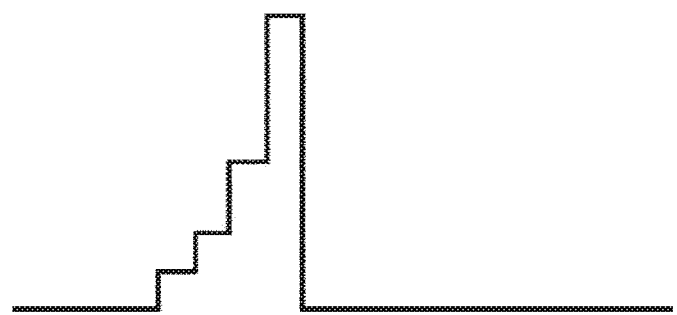
FIG. 14 is a graph showing a first example of an irradiation code.

FIG. 14 shows an example of a waveform of the irradiation signal (the irradiation code) in a case where weighted addition is performed in the value direction. Regarding the value of the irradiation signal, the first bit is equal to the unit code $u_3$, the second bit is two times the unit code $u_2$, the third bit is four times the unit code $u_1$, and the fourth bit is eight times the unit code $u_0$. In other words, a ratio of the value of each bit of the irradiation signal is equal to a ratio of the weight for each unit code.

Then, for example, the intensity of the irradiation light emitted from the light source 32 is controlled according to the value of the irradiation signal. For example, in a case where the intensity of the irradiation light in a case where the weight $w_1$ is 1 is used as a reference, the intensity of the irradiation light is set to one times the reference at the first bit of the irradiation code, is set to two times the reference at the second bit, is set to four times the reference at the third bit, and is set to eight times the reference at the fourth bit.

The control of the intensity of the irradiation light, for example, may be realized by controlling the brightness of the light source 32, or may be realized by controlling the number of light sources 32 that are turned on by providing a plurality of the light sources 32.

Figure 15:
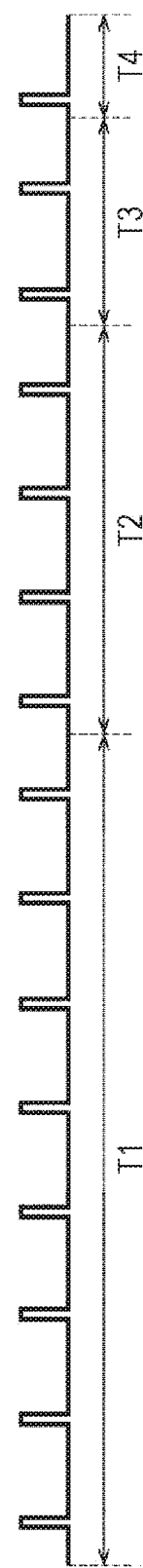
FIG. 15 is a graph showing a second example of an irradiation code.

On the other hand, FIG. 15 shows a waveform of the irradiation signal (the irradiation code) in a case where weighted addition is performed in the time direction. In the irradiation signal, in the period T1, eight unit codes $u_0$ are interleaved in the time direction. In the next period T2, four unit codes $u_1$ are interleaved in the time direction. In the next period T3, two unit codes $u_2$ are interleaved in the time direction. In the next period T4, one unit code $u_3$ is interleaved. Thereby, when the periods T1 to T4 is defined as one frame, a ratio of the number of each of the unit codes $u_0$, the unit codes $u_1$, the unit codes $u_2$, and the unit code $u_3$ is the same as a ratio of the weight of each set of unit codes.

Figure 16:
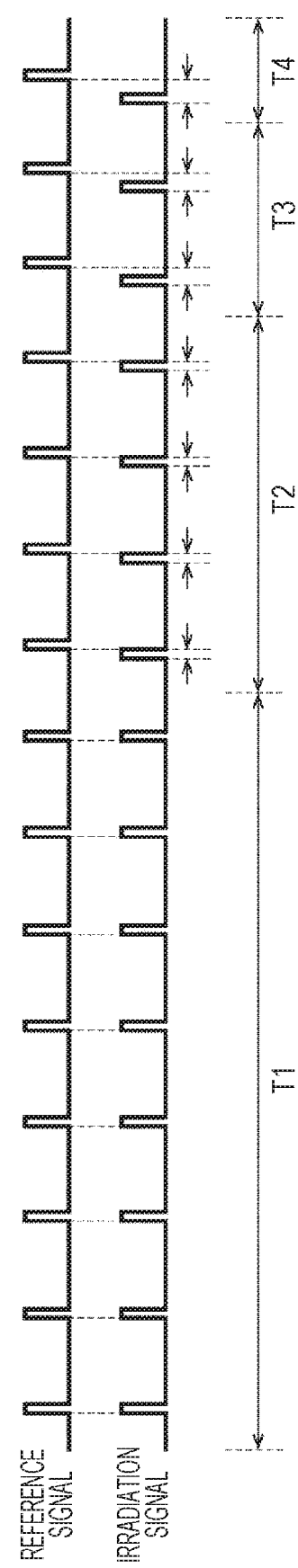
FIG. 16 is a graph showing a first example of a relationship between a reference code and an irradiation code.

FIG. 16 is a diagram comparing the irradiation signal in FIG. 15 with the reference signal.

In this example, in the reference signal, the basic code (=unit code $u_0$) is repeatedly interleaved. Therefore, in the period T1, the phase of the pulse of the reference signal is the same as the phases of the pulses of the irradiation signal. In the period T2, the pulse of the irradiation signal advances one bit more than the pulse of the reference signal. In the period T3, the pulse of the irradiation signal advances two bits more than the pulse of the reference signal. In the period T4, the pulse of the irradiation signal advances three bits more than the pulse of the reference signal.

Here, for example, the irradiation code may be generated by defining the codes in the periods T1 to T4 in FIG. 15 as one set and arranging a plurality of the sets in one frame.

Further, the unit codes need not necessarily be arranged in the order of phases, and can be arranged in an arbitrary order as long as the ratio of the number of each set of unit codes in one frame is the same as the ratio of the weight of each set of unit codes.

Further, in a case where the basic code includes a plurality of pulses such as the M-sequence, it is possible to perform weighted addition in the value direction or the time direction in a similar manner as described above.

Further, in a case where a plurality of light source 32 are provided, for example, each light source 32 may be associated with a unit code of which phase is different from each other and each light source 32 may be blinked at the same time according to the associated unit code. Thereby, instead of interleaving the unit codes in the time direction as in FIGS. 15 and 16, it is possible to superimpose a plurality of unit codes of which phases are different from each other in the same time slot.

2. Modified Example

Hereinafter, a modified example of the embodiment of the present technology described above will be described.

In the above description, an example is shown where the irradiation code is generated by superimposing unit codes of which phases are different from each other while the phase of the reference code is fixed. However, for example, the reference code may be generated by superimposing unit codes of which phases are different from each other while the phase of the irradiation code is fixed.

Figure 17:
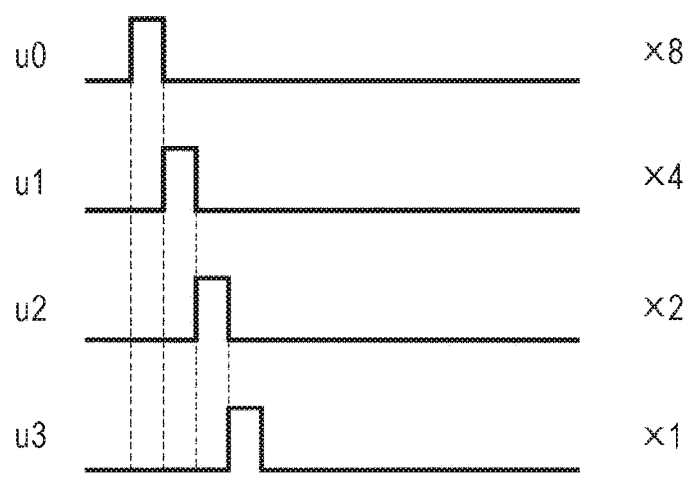
FIG. 17 is a graph showing a second example of a unit code.

Here, with reference to FIGS. 17 to 19, an example of a case where the reference code is generated by superimposing unit codes of which phases are different from each other while the phase of the irradiation code is fixed will be described. Specifically, an example of a case where a correlation function of the reference signal and the irradiation signal is set to the correlation function shown in FIG. 12 described above will be described.

In the correlation function, for example, as shown in the following formula (6), the reference code c is obtained by weighted-adding the unit codes $u_0$ to $u_3$ of FIG. 17.

$$c=w_0 \times u_0 + w_1 \times u_2 + w_2 \times u_2 + w_3 \times u_3 \qquad (6)$$

Here, the unit coder $u_0$ is a code of which phase is the same as that of the basic code. The unit codes $u_1$ to $u_3$ are codes of which phases are delayed by one bit, two bits, and three bits, respectively, from the phase of the basic code.

Figure 18:
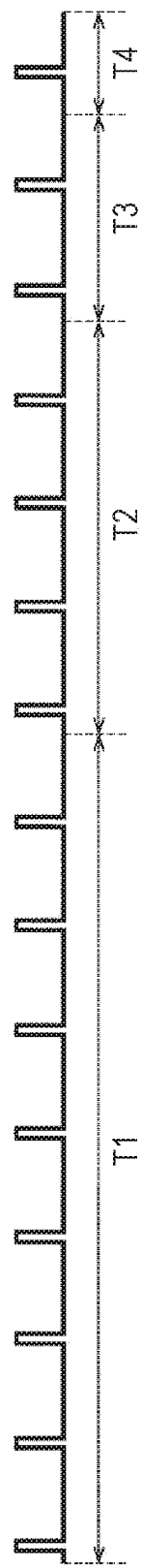
FIG. 18 is a graph showing an example of a reference code.

Here, for example, as shown in FIG. 18, the weighted addition of the formula (6) may be realized by performing addition in the time direction.

In the irradiation signal of FIG. 18, in the period T1, eight unit codes $u_0$ are interleaved in the time direction. In the next period T2, four unit codes $u_1$ are interleaved in the time direction. In the next period T3, two unit codes $u_2$ are interleaved in the time direction. In the next period T4, one unit code $u_3$ is interleaved. Thereby, when the periods T1 to T4 is defined as one frame, a ratio of the number of each of the unit codes $u_0$, the unit codes $u_1$, the unit codes $u_2$, and the unit code $u_3$ is the same as a ratio of the weight of each set of unit codes.

Figure 19:
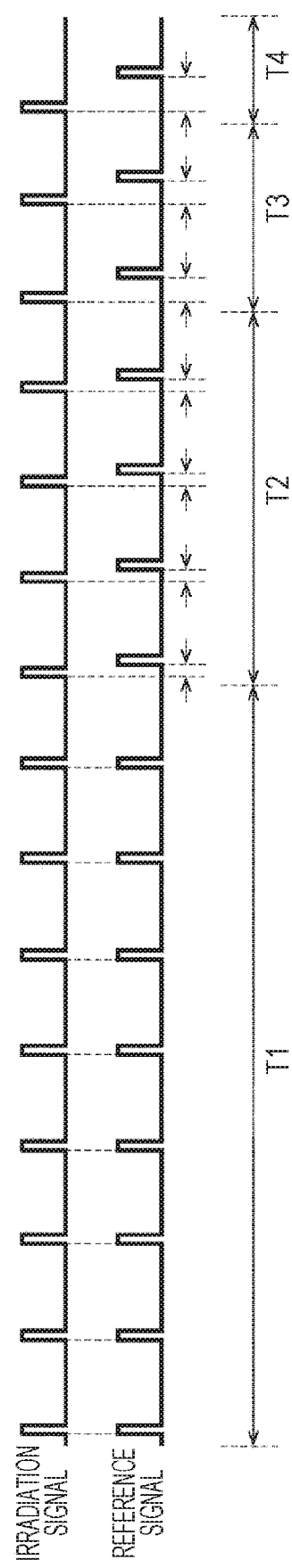
FIG. 19 is a graph showing a second example of a relationship between a reference code and an irradiation code.

FIG. 19 is a diagram comparing the reference signal in FIG. 18 with the irradiation signal.

In this example, in the irradiation signal, the basic code (=unit code $u_0$) is repeatedly interleaved. Therefore, in the period T1, the phase of the pulse of the reference signal is the same as the phase of the pulse of the irradiation signal. In the period T2, the pulse of the reference signal delays by one bit from the pulse of the irradiation signal. In the period T3, the pulse of the reference signal delays by two bits from the pulse of the irradiation signal. In the period T4, the pulse of the reference signal delays by three bits from the pulse of the irradiation signal.

Here, in a similar manner as in the case of the irradiation code, for example, the reference code may be generated by defining the codes in the periods T1 to T4 in FIG. 18 as one set and arranging a plurality of the sets in one frame.

Further, the unit codes need not necessarily be arranged in the order of phases, and can be arranged in an arbitrary order as long as the ratio of the number of each set of unit codes in one frame is the same as the ratio of the weight of each set of unit codes.

Further, in a case where the basic code includes a plurality of pulses such as the M-sequence, it is possible to perform weighted addition in the time direction in a similar manner as described above.

Further, for example, both of the reference code and the irradiation code may be generated by superimposing unit codes of which phases are different from each other.

Further, in the above description, an example is shown where the basic code of the reference code and the basic code of the irradiation code are the same code. However, the basic codes need not necessarily be the same code as long as the condition described above referring to FIG. 9 is satisfied.

Further, in the above description, the irradiation code is a code of a binary value which is 1 or 0. However, the irradiation code may be a code having three values or more.

Further, the control unit 23 can freely control the distance measuring accuracy by controlling the weights $wa_i$ and $wb_i$ and controlling the inclination of the correlation function of the reference signal and the irradiation signal. For example, the larger the distance, the higher the distance measuring accuracy can be, and the smaller the distance, the lower the distance measuring accuracy can be, by setting so that the larger the distance, the steeper the inclination of the correlation function, and the smaller the distance, the gentler the inclination of the correlation function. Further, for example, the distance measuring accuracy in a desired distance range can be improved by making the inclination of the correlation function in the desired distance range steep. Further, for example, the distance measuring accuracy in a plurality of desired distance ranges can be improved by setting a plurality of ranges in which the inclination of the correlation function is steep.

Further, although in the above description, an example is shown where the phase differences between the unit codes are the same, the phase differences between the unit codes need not be necessarily the same.

Figure 20A:
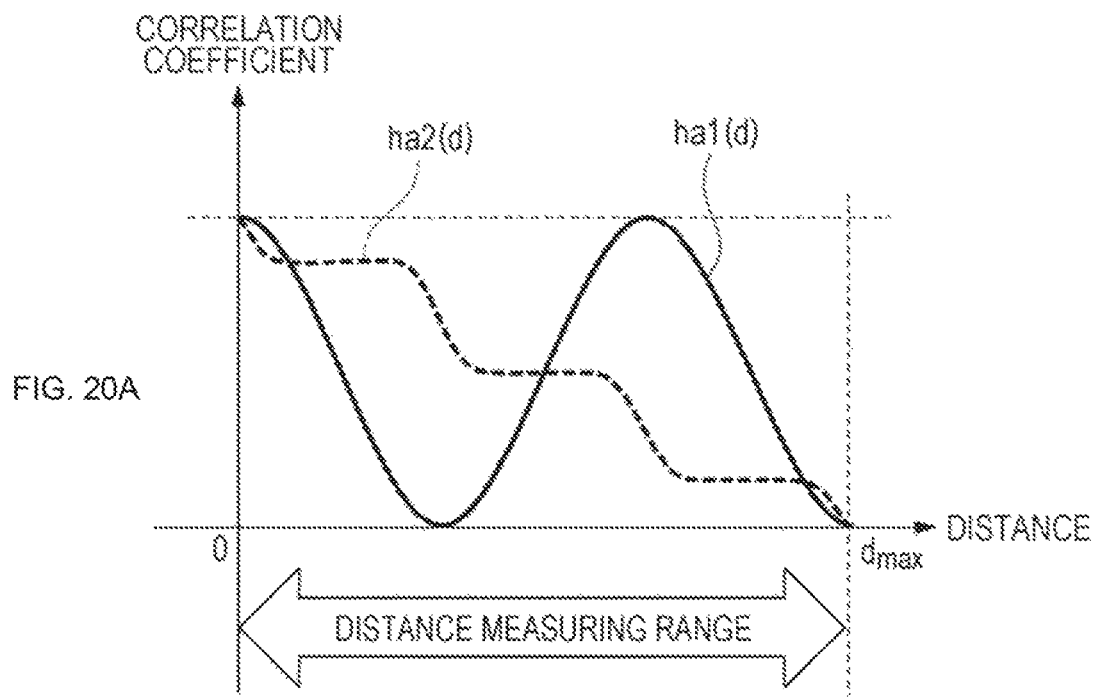
FIGS. 20A and 20B are graphs showing a third example of a correlation function.
Figure 20B:
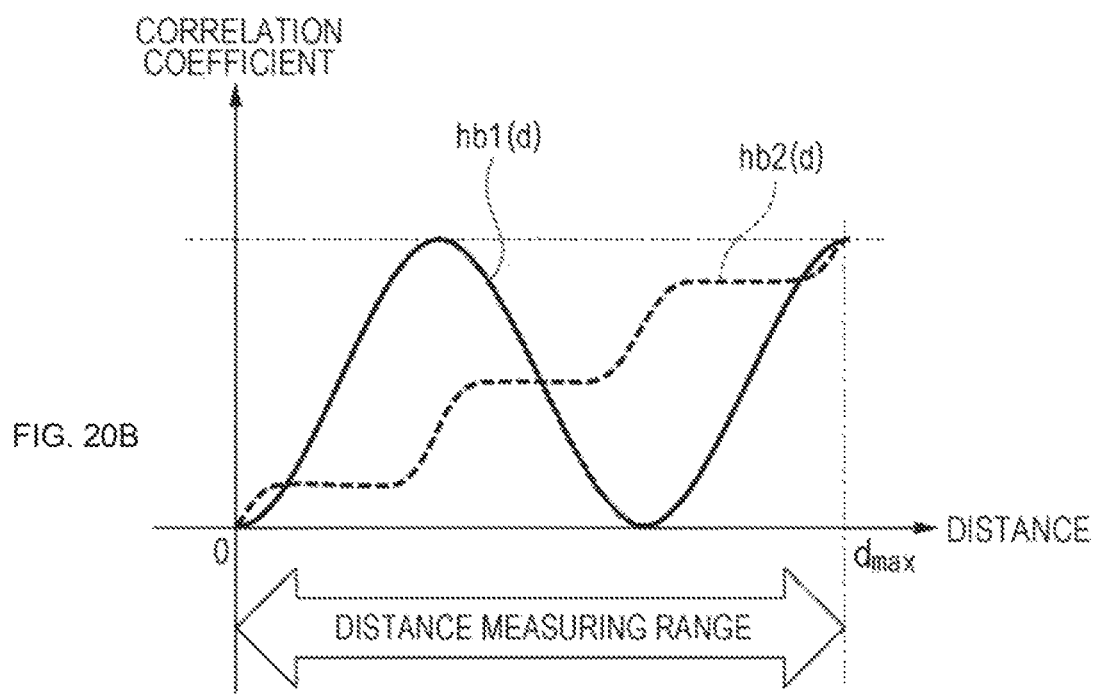

Further, for example, as shown in FIGS. 20A and 20B, the distance to the object may be measured by using two correlation functions.

For example, the distance to the object may be measured by using an irradiation signal and a reference signal corresponding to a correlation function $ha1(d)$ in FIG. 20A and an irradiation signal and a reference signal corresponding to a correlation function $hb1(d)$ in FIG. 20B in a first measurement and using an irradiation signal and a reference signal corresponding to a correlation function $ha2(d)$ in FIG. 20A and an irradiation signal and a reference signal corresponding to a correlation function $hb2(d)$ in FIG. 20B in a second measurement.

Specifically, the correlation function $ha1(d)$ is a function which has a waveform close to a cosine wave and of which period is function of a distance dmax/2. The correlation function $hb1(d)$ is a function which has a waveform close to a waveform obtained by delaying the phase of the cosine wave by $\pi$ radian and of which period is a function of the distance dmax/2. Further, in the distance measuring range from the distance 0 to the distance dmax, $ha1(d)+hb1(d)$ is constant.

Then, when a pixel signal in a case where the irradiation signal and the reference signal corresponding to the correlation function $ha1(d)$ are used is defined as Sa1 and a pixel signal in a case where the irradiation signal and the reference signal corresponding to the correlation function $hb1(d)$ are used is defined as Sb1, a measured value v1 (a distance pixel signal indicating the measured value v1) that satisfies the following formula (7) is obtained at the first measurement.

[Expression 4]

$$v1 \propto \frac{Sb1}{Sa1 + Sb1} \quad (7)$$

That is, the measured value v1 is proportional to a ratio of the pixel signal Sb1 to the sum of the pixel signal Sa1 and the pixel signal Sb1.

On the other hand, the correlation function $ha2(d)$ is a monotonically decreasing function in the distance measuring range and the correlation function $hb2(d)$ is a monotonically increasing function in the distance measuring range. Further, $ha2(d)+hb2(d)$ is constant in the distance measuring range, Further, the inclination of the correlation function $ha2(d)$ becomes steep near a positive or negative peak of the correlation function $ha1(d)$ and in a range where the inclination of the correlation function $ha1(d)$ is gentle, and becomes a negative value near 0 in ranges other than the above. On the other hand, the inclination of the correlation function $hb2(d)$ becomes steep near a positive or negative peak of the correlation function $hb1(d)$ and in a range where the inclination of the correlation function $hb1(d)$ is gentle, and becomes a positive value near 0 in ranges other than the above.

Then, when a pixel signal in a case where the irradiation signal and the reference signal corresponding to the correlation function $ha2(d)$ are used is defined as Sa2 and a pixel signal in a case where the irradiation signal and the reference signal corresponding to the correlation function $hb2(d)$ are used is defined as Sb2, a measured value v2 (a distance pixel signal indicating the measured value v2) that satisfies the following formula (8) is obtained at the second measurement.

[Expression 5]

$$v2 \propto \frac{Sb2}{Sa2 + Sb2} \quad (8)$$

That is, the measured value v2 is proportional to a ratio of the pixel signal Sb2 to the sum of the pixel signal Sa2 and the pixel signal Sb2.

Here, regarding the correlation functions $ha1(d)$ and $hb1(d)$, the periods are short and the inclinations are steep in most of the distance measuring range as compared with the correlation functions $ha2(d)$ and $hb2(d)$. Therefore, in a case where the measured value v1 is used, the distance measuring accuracy improves inmost of the distance measuring range as compared with a case where the measured value v2 is used. On the other hand, correlation coefficients of the correlation functions $ha1(d)$ and $hb1(d)$ may be the same at different distances in the distance measuring range, so that in a case where the measured value v1 is used, the distance to the object may not be determined uniquely and a plurality of distances may be candidates.

On the other hand, regarding the correlation functions $ha2(d)$ and $hb2(d)$, the periods are long and the inclinations are gentle in most of the distance measuring range as compared with the correlation functions $ha1(d)$ and $hb1(d)$. Therefore, in a case where the measured value v2 is used, the distance measuring accuracy degrades in most of the distance measuring range as compared with a case where the measured value v1 is used. However, in a range where the inclinations of the correlation functions $ha1(d)$ and $hb1(d)$ become substantially zero, the inclinations of the correlation functions $ha2(d)$ and $hb2(d)$ become steep, so that in the range, the distance measuring accuracy improves by using the measured value v2. Further, the correlation functions $ha2(d)$ and $hb2(d)$ monotonically decrease or monotonically increase in the distance measuring range, so that in a case where the measured value v2 is used, the distance to the object is determined uniquely.

Therefore, it is possible to obtain the distance to the object uniquely on the basis of the distance obtained by using the measured value v1 and the distance obtained by using the measured value v2. Further, for example, it is possible to further improve the distance measuring accuracy by using the distance obtained by using the measured value v1 in a range where the inclinations of the correlation functions $ha1(d)$ and $hb1(d)$ are steeper than the inclinations of the correlation functions $ha2(d)$ and $hb2(d)$ and using the distance obtained by using the measured value v2 in ranges other than the above.

Further, the configuration example of the imaging element 42 described above is an example, and it is possible to employ an imaging element of an arbitrary configuration that can output a pixel signal indicating the correlation between the reference signal and the reception light.

Further, for example, a part or all of the signal processing circuit 43 may be provided in the imaging element 42, and/or a part or all of the signal processing unit 108 of the imaging element 42 may be provided in the signal processing circuit 43.

3. Usage Example of Imaging Apparatus

Figure 21:
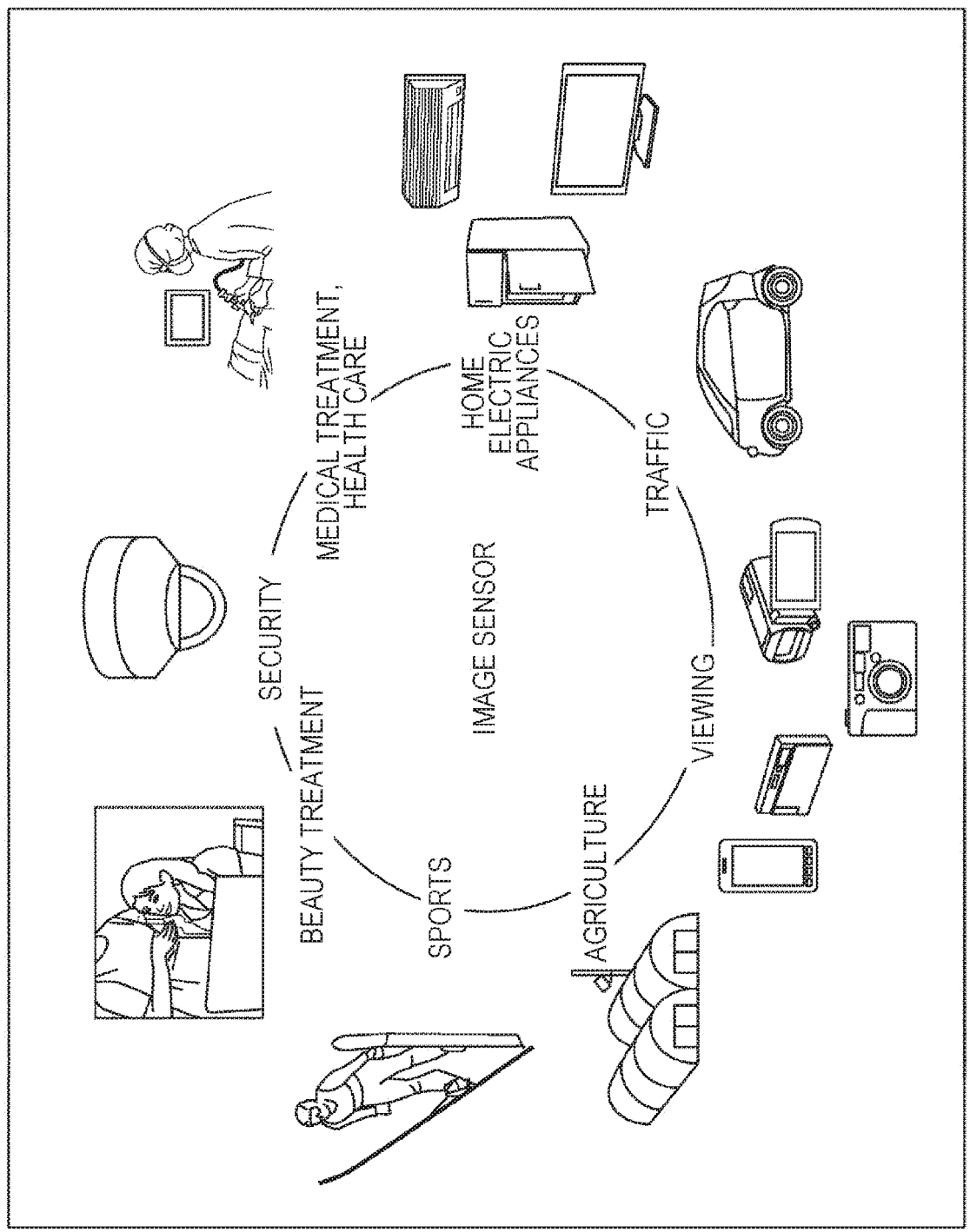
FIG. 21 is a diagram showing a usage example of an imaging apparatus.

FIG. 21 is a diagram showing a usage example of the imaging apparatus 11 described above.

The imaging apparatus 11 described above can be used in various cases of sensing light such as, for example, visible light, infrared light, ultraviolet light, and X-ray as described below.

Apparatuses such as a digital camera and a mobile device with a camera function, which capture images for viewing.

Apparatuses used for traffic, such as an on-vehicle sensor that captures images in front of, in rear of, around, inside a vehicle, and the like, a monitoring camera that monitors running vehicles and roads, and a distance measuring sensor that measures a distance between vehicles and the like, for safety driving such as automatic stop and for a driver to recognize a state or the like.

Apparatuses used for home electric appliances such as a TV, a refrigerator, and an air conditioner for capturing gesture of a user and performing a device operation according to the gesture.

Apparatuses used for medical care and healthcare, such as an endoscope and an apparatus that performs blood vessel imaging by receiving infrared light.

Apparatuses used for security, such as a monitoring camera used for crime prevention and a camera used for personal authentication.

Apparatuses used for beauty care, such as a skin measuring instrument that captures images of skin and a microscope that captures images of scalp skin.

Apparatuses used for sports, such as an action camera and a wearable camera for sport usage and the like.

Apparatuses used for agriculture, such as a camera for monitoring states of a field and crops.

Note that the embodiment of the present technology is not limited to the embodiment described above and may be variously modified without departing from the scope of the technique.

Also, for example, the present technology can have configurations as described below.

(1) An imaging apparatus including:

a control unit that controls outputs of an irradiation signal including an irradiation code used to control a pattern where irradiation light is emitted and a reference signal including a reference code that indicates a pattern used to detect correlation with reception light including reflected light of the irradiation light; and an imaging unit that includes a photoelectric conversion element, generates a pixel signal indicating correlation between the reception light incident into the photoelectric conversion element and the reference signal, and generates a distance pixel signal based on a distance to an object on the basis of a first ratio between a first pixel signal in a case where a first combination of the irradiation signal and the reference signal is used and a second pixel signal in a case where a second combination of the irradiation signal and the reference signal is used, in which within a predetermined phase range, a first correlation function indicating correlation between the irradiation signal and the reference signal in the first combination and a second correlation function indicating correlation between the irradiation signal and the reference signal in the second combination are non-linear, and a sum of the first correlation function and the second correlation function in each phase is substantially constant.

(2) The imaging apparatus according to (1), in which either one code of the irradiation code and the reference code is a code obtained by weighted-adding a plurality of unit codes of which phases are obtained by shifting a phase of a basic code of which cross-correlation with the other code has an impulse shape by different shift amounts, the one code in the first combination is a code obtained by weighted-adding the plurality of unit codes by using a first weight, and the one code in the second combination is a code obtained by weighted-adding the plurality of unit codes by using a second weight.

(3) The imaging apparatus according to (2), in which
the control unit can control the first weight and the second weight.

(4) The imaging apparatus according to any of (1) to (3), in which
within the predetermined phase range, one of the first correlation function and the second correlation function is a monotonically increasing function and the other is a monotonically decreasing function.

(5) The imaging apparatus according to any of (1) to (4), in which
the imaging unit generates the distance pixel signal on the basis of a second ratio between a third pixel signal in a case where a third combination of the irradiation signal and the reference signal is used and a fourth pixel signal in a case where a fourth combination of the irradiation signal and the reference signal is used, in addition to the first ratio, and
within the predetermined phase range, a third correlation function indicating correlation between the irradiation signal and the reference signal in the third combination and a fourth correlation function indicating correlation between the irradiation signal and the reference signal in the fourth combination are non-linear, and a sum of the third correlation function and the fourth correlation function in each phase is substantially constant.

(6) The imaging apparatus according to (5), in which
periods of the first correlation function and the second correlation function are different from periods of the third correlation function and the fourth correlation function, and
there are a range where inclinations of the first correlation function and the second correlation function are steeper than inclinations of the third correlation function and the fourth correlation function and a range where the inclinations of the first correlation function and the second correlation function are gentler than the inclinations of the third correlation function and the fourth correlation function.

(7) An imaging control method including the steps of:
controlling outputs of an irradiation signal including an irradiation code used to control a pattern where irradiation light is emitted and a reference signal including a reference code that indicates a pattern used to detect correlation with reception light including reflected light of the irradiation light; and
generating a pixel signal indicating correlation between the reception light incident into a photoelectric conversion element and the reference signal, and generating a distance pixel signal based on a distance to an object on the basis of a ratio between a first pixel signal in a case where a first combination of the irradiation signal and the reference signal is used and a second pixel signal in a case where a second combination of the irradiation signal and the reference signal is used,
in which within a predetermined phase range, a first correlation function indicating correlation between the irradiation signal and the reference signal in the first combination and a second correlation function indicating correlation between the irradiation signal and the reference signal in the second combination are non-linear, and a sum of the first correlation function and the second correlation function in each phase is substantially constant.

REFERENCE SIGNS LIST

11 Imaging apparatus
21 Illumination unit
22 Imaging unit
23 Control unit
31 Illumination control unit
32 Light source
42 Imaging element
43 Signal processing circuit
101 Pixel array unit
102 Vertical drive unit
103 Column processing unit
104 Horizontal drive unit
105 System control unit
108 Signal processing unit
161 Photoelectric conversion element
162$a$, 162$b$ Transfer gate
163$a$, 163$b$ FD
164$a$, 164$b$ Reset transistor
165 Selection transistor
166$a$, 166$b$ Amplification transistor

The invention claimed is:

1. An imaging apparatus, comprising:
a control unit configured to:
control output of an irradiation signal including an irradiation code used to control a pattern where irradiation light is emitted; and
control output of a reference signal including a reference code that indicates a pattern used to detect correlation between the reference signal and reception light, wherein the reception light includes reflected light of the irradiation light; and
an imaging unit that includes a photoelectric conversion element, wherein the imaging unit is configured to:
generate a pixel signal indicating the correlation between the reception light incident into the photoelectric conversion element and the reference signal; and
generate a distance pixel signal based on a distance to an object, wherein
the distance pixel signal is generated based on a first ratio between a first pixel signal in a case where a first combination of the irradiation signal and the reference signal is used and a second pixel signal in a case where a second combination of the irradiation signal and the reference signal is used,
within a determined phase range, a first correlation function indicating correlation between the irradiation signal and the reference signal in the first combination and a second correlation function indicating correlation between the irradiation signal and the reference signal in the second combination are non-linear, and
a sum of the first correlation function and the second correlation function in each phase is substantially constant.

2. The imaging apparatus according to claim 1, wherein
either one code of the irradiation code and the reference code is a code obtained by weighted-adding a plurality of unit codes,
phases of the plurality of unit codes are obtained by shifting a phase of a basic code by different shift amounts,
cross-correlation of the basic code with other code of the irradiation code and the reference code has an impulse shape,
the one code in the first combination is a code obtained by weighted-adding the plurality of unit codes based on a first weight, and
the one code in the second combination is a code obtained by weighted-adding the plurality of unit codes based on a second weight.

3. The imaging apparatus according to claim 2, wherein the control unit is further configured to control the first weight and the second weight.

4. The imaging apparatus according to claim 1, wherein within the determined phase range, one of the first correlation function and the second correlation function is a monotonically increasing function and other of the first correlation function and the second correlation function is a monotonically decreasing function.

5. The imaging apparatus according to claim 1, wherein the imaging unit is further configured to generate the distance pixel signal based on a second ratio between a third pixel signal in a case where a third combination of the irradiation signal and the reference signal is used and a fourth pixel signal in a case where a fourth combination of the irradiation signal and the reference signal is used, within the determined phase range, a third correlation function indicating correlation between the irradiation signal and the reference signal in the third combination and a fourth correlation function indicating correlation between the irradiation signal and the reference signal in the fourth combination are non-linear, and a sum of the third correlation function and the fourth correlation function in each phase is substantially constant.

6. The imaging apparatus according to claim 5, wherein periods of the first correlation function and the second correlation function are different from periods of the third correlation function and the fourth correlation function, inclinations of the first correlation function and the second correlation function are steeper than inclinations of the third correlation function and the fourth correlation function in a first distance measuring range, and the inclinations of the first correlation function and the second correlation function are gentler than the inclinations of the third correlation function and the fourth correlation function in a second distance measuring range.

7. An imaging control method, comprising:

controlling output of an irradiation signal including an irradiation code used to control a pattern where irradiation light is emitted;

controlling output of a reference signal including a reference code that indicates a pattern used to detect correlation between the reference signal and reception light, wherein the reception light includes reflected light of the irradiation light;

generating a pixel signal indicating the correlation between the reception light incident into a photoelectric conversion element and the reference signal; and generating a distance pixel signal based on a distance to an object, wherein the distance pixel signal is generated based on a ratio between a first pixel signal in a case where a first combination of the irradiation signal and the reference signal is used and a second pixel signal in a case where a second combination of the irradiation signal and the reference signal is used, within a determined phase range, a first correlation function indicating correlation between the irradiation signal and the reference signal in the first combination and a second correlation function indicating correlation between the irradiation signal and the reference signal in the second combination are non-linear, and a sum of the first correlation function and the second correlation function in each phase is substantially constant.

\* \* \* \* \*